United States Patent
Yoshida

(10) Patent No.: US 9,028,912 B2
(45) Date of Patent: May 12, 2015

(54) METHOD OF MANUFACTURING OPTICAL FIBER BASE MATERIAL AND APPARATUS THEREFOR

(75) Inventor: Makoto Yoshida, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1157 days.

(21) Appl. No.: 11/730,061

(22) Filed: Mar. 29, 2007

(65) Prior Publication Data

US 2007/0248755 A1    Oct. 25, 2007

Related U.S. Application Data

(63) Continuation of application No. PCT/JP2005/009324, filed on May 23, 2005.

(30) Foreign Application Priority Data

Sep. 30, 2004    (JP) .................................. 2004-288177

(51) Int. Cl.
C23C 16/26    (2006.01)
C03B 37/014    (2006.01)

(52) U.S. Cl.
CPC ......... *C03B 37/0142* (2013.01); *C03B 2207/42* (2013.01); *C03B 2207/50* (2013.01); *C03B 2207/60* (2013.01)

(58) Field of Classification Search
None
See application file for complete search history.

(56) References Cited

U.S. PATENT DOCUMENTS

| | | | |
|---|---|---|---|
| 4,101,300 A * | 7/1978 | Imoto et al. ..................... | 65/382 |
| 6,047,564 A * | 4/2000 | Schaper et al. ................ | 65/17.4 |
| 6,245,442 B1 * | 6/2001 | Towata et al. .................. | 428/614 |
| 6,324,871 B1 * | 12/2001 | Nakamura et al. .............. | 65/421 |
| 2003/0029202 A1 * | 2/2003 | Ooishi et al. ..................... | 65/384 |
| 2004/0187525 A1 * | 9/2004 | Coffey et al. .................... | 65/390 |
| 2004/0237595 A1 * | 12/2004 | Fogliani et al. ................. | 65/421 |
| 2005/0005648 A1 * | 1/2005 | Lee et al. ......................... | 65/382 |

FOREIGN PATENT DOCUMENTS

| | | |
|---|---|---|
| JP | 3-22256 | 5/1991 |
| JP | 2000-256032 | 9/2000 |
| JP | 2001-19439 | 1/2001 |
| JP | 2003-313042 | 11/2003 |
| WO | WO2004035495 | * 4/2004 |

OTHER PUBLICATIONS

Temperature sensors. Printed 2011, evidenciary reference.*

* cited by examiner

*Primary Examiner* — Joseph Miller, Jr.
(74) *Attorney, Agent, or Firm* — McGinn IP Law Group, PLLC

(57) ABSTRACT

In a method of manufacturing an optical fiber base material including depositing soot generated by flame hydrolysis, the fluctuation band of the surface temperature of a burner fixing section including a burner holder and its fixture for burners for compounding the optical fiber base material is kept equal to or less than 80 degree C.
The temperature can be controlled by a heat shield plate arranged between a burner flame and a burner fixing section and a temperature control mechanism that heats or cools the burner fixing section. Thereby the relative position between the burner and the soot deposition is stabilized, so that the manufacturing method being capable of manufacturing an optical fiber base material having a stable refractive index and the apparatus therefor can be provided.

5 Claims, 6 Drawing Sheets

METHOD OF MANUFACTURING OPTICAL FIBER BASE MATERIAL AND APPARATUS THEREFOR

CROSS REFERENCE TO RELATED APPLICATION

This is a continuation application of PCT/JP2005/009324 filed on May 23, 2005 which claims priority from a Japanese Patent Application No. 2004-288177 filed on Sep. 30, 2004, the contents of which are incorporated herein by reference.

BACKGROUND

1. Technical Field

The present invention relates to a method of manufacturing an optical fiber base material and an apparatus therefor. Specifically, the present invention relates to a manufacturing method applicable to manufacture an optical fiber material by utilizing flame hydrolysis and a manufacturing apparatus therefor.

2. Related Art

A manufacturing apparatus by using the VAD method has been known as an apparatus for manufacturing an optical fiber base material. In that apparatus, a quartz base material 2 is suspended in a quartz chamber 1 as shown in FIG. 1, and soot is deposited the quartz base material 2 to acquire a soot deposition 3. A core burner 4 toward the tip of the bottom end of the quartz base material 2 and a cladding burner 5 toward the side surface of the quartz base material 2 are provided, respectively as burners for compounding the soot. Each of the burners is supported by a burner fixing section including a burner holder 6 and a fixture 7 thereof.

In addition to a material line for such as silicon tetrachloride ($SiCl_4$) being a core material, germanium tetrachloride ($GeCl_4$) as dopant for controlling the refractive index, a gas line for such as $H_2$ gas and $O_2$ gas for oxyhydrogen flame is connected to the core burner 4. Meanwhile, a gas lines for such as silicon tetrachloride gas and oxyhydrogen gas are connected to the cladding burner 5.

Each of the core burner 4 and the cladding burner 5 are supported by the fixture 7. Thereby the position of each burner can be adjusted such that the relative position between the burner and the tip of the soot deposition is optimized.

The optical fiber base material is manufactured by the following steps: splaying a source gas from the core burner 4 and the cladding burner 5 to the targeted portion of the quartz base material 2 as rotating the quartz base material 2; depositing soot generated by the flame hydrolysis on the quartz base material 2 in the axial direction; pulling up the quartz base material 2 dependent on the growth thereof, thereby the soot deposition 3 including a core with higher refractive index and a cladding with lower refractive index can be obtained; and dehydrating and transparently vitrifying the soot deposition 3 by a electric furnace.

For the manufacturing method of compounding an optical fiber glass material, the relative positional relationship between the burner and the soot deposition is significantly important because not only it affects the sticking rate and the density of soot but also it is the factor that determines the refractive index profile of the acquired glass base material. Particularly, in the case of the VAD method, since the refractive index profile of the acquired glass base material is varied delicately when any displacement is generated in the relative positional relationship between the burner and the tip of the soot deposition, various methods have been proposed in order to fix the burner.

For example, a molding method that fixes the burner to the base with resin or gypsum as means for solving the displacement of the burner because of a lack of the grasp has been proposed in Japanese utility model Application Publication No. 03-22256.

In addition, a method for improving the fixing accuracy and the reproducibility of the burner by defining the accuracy of the hole for holding the burner and by using the burner fixture employing a fitting method has been proposed, for example, in Japanese Patent Application Publication No. 2000-256032.

However, recently it has been desired to enlarge the optical fiber glass base material, therefore, the amount of the source gas supplied has to been increased. Then, a problem has been generated that the burner is displaced and the fixed portion is loosed because the burner and the burner fixing section are thermally expanded due to the heat cycle for which the soot is deposited and the deposition is stopped so that the relative positional between the burner and the soot deposition is displaced. Moreover, another problem has been generated due to the displacement that the sticking rate, the density and the refractive index profile of the soot in the axial direction of the base material are changed.

Thus, an advantage of the present invention is to provide a manufacturing method for acquiring an optical fiber base material having a stable refractive index profile by constantly keeping the relative position between the burner and the soot deposition and an apparatus therefor. Particularly, an advantage of the present invention is to provide a manufacturing method for stabilizing the position of the burner after the relative position between the burner and the soot deposition is adjusted without changing over time during depositing the soot and an apparatus therefor.

To obtain the above-described advantages, a first aspect of the present invention provides a method of manufacturing an optical fiber base material comprising depositing soot generated by flame hydrolysis by using a burner which generates a flame to compound the optical fiber base material. The fluctuation band of the surface temperature of a burner fixing section that positions the burner is kept equal to or less than 80 degree C. Here, it is preferred that the fluctuation band is lesser, of course, and particularly, the refractive index profile of the resultant optical fiber base material is sufficiently stabilized if the fluctuation band is equal to or less than 80 degree C. as described in detail later.

In addition, according to an embodiment, the temperature of the burner fixing section is controlled by a temperature control mechanism in the manufacturing method. Thereby mechanism that keeps the fluctuation band of the surface temperature of the burner fixing section can be provided.

Moreover, according to another embodiment, the burner fixing section includes a burner holder and a fixture thereof, and the temperature control mechanism includes a heat shield plate arranged between the burner flame and at least one of the burner holder and the fixture in the manufacturing method. Thereby the radiant heat of the burner flame is shielded, so that the surface temperature of the burner fixing section can be prevented from being changed.

According to further another embodiment, the temperature control mechanism includes at least one of a temperature control mechanism that heats the burner fixing section and a temperature control mechanism that cools the burner fixing section in the manufacturing method. Here, the "temperature control" may include "heating", "cooling" and "keeping the temperature". "Heating" may include directly or indirectly heating with such as an electric heater. "Cooling" may include cooling with refrigerant. Thereby the surface temperature of the burner fixing section can be kept within a predetermined range.

A second aspect of the present invention provides, in a method of manufacturing an optical fiber base material including a step of depositing soot generated by flame hydrolysis by using a burner which generates a flame to compound an optical fiber base material, a manufacturing apparatus including a temperature control mechanism that keeps the fluctuation band of the surface temperature of a burner fixing section which positions the burner equal to or less than 80 degree C. Here, it is preferred that the fluctuation band is lesser, of course, and particularly, the refractive index profile of the resultant optical fiber base material is sufficiently stabilized if the fluctuation band is equal to or less than 80 degree C. and the amount of fluctuation of all over the optical fiber base material is not beyond the predetermined bounds of permissibility.

According to another embodiment, the burner fixing section includes a burner holder and a fixture thereof, and the temperature control mechanism includes a heat shield plate arranged between the burner flame and at least one of the burner holder and the fixture in the manufacturing apparatus. Thereby the radiant heat of the burner flame is shielded, so that the surface temperature of the burner fixing section can be prevented from being changed.

According to further another embodiment, the temperature control mechanism includes at least one of a temperature control mechanism that heats the burner fixing section and a temperature control mechanism that cools the burner fixing section in the manufacturing apparatus. Here, the "temperature control" may include "heating", "cooling" and "keeping the temperature". "Heating" may include directly or indirectly heating with such as an electric heater. "Cooling" may include cooling with refrigerant. Thereby mechanism that keeps the surface temperature of the burner fixing section within a predetermined range can be formed.

Here, all necessary features of the present invention are not listed in the summary of the invention. The sub-combinations of the features may become the invention.

According to the present invention, the position of the burner after the relative position between the burner and the soot deposition is adjusted can be stabilized not only during depositing the soot but also between each manufacturing step of the soot deposition. Thereby an optical fiber base material having a stable refractive index profile can be manufactured.

DESCRIPTION OF EXEMPLARY EMBODIMENTS

Hereinafter, the present invention will now be described through referred embodiments with reference to the drawings. Here, all necessary features of the present invention are not listed in the summary of the invention. The sub-combinations of the features may become the invention.

Embodiment 1

Figure 1:
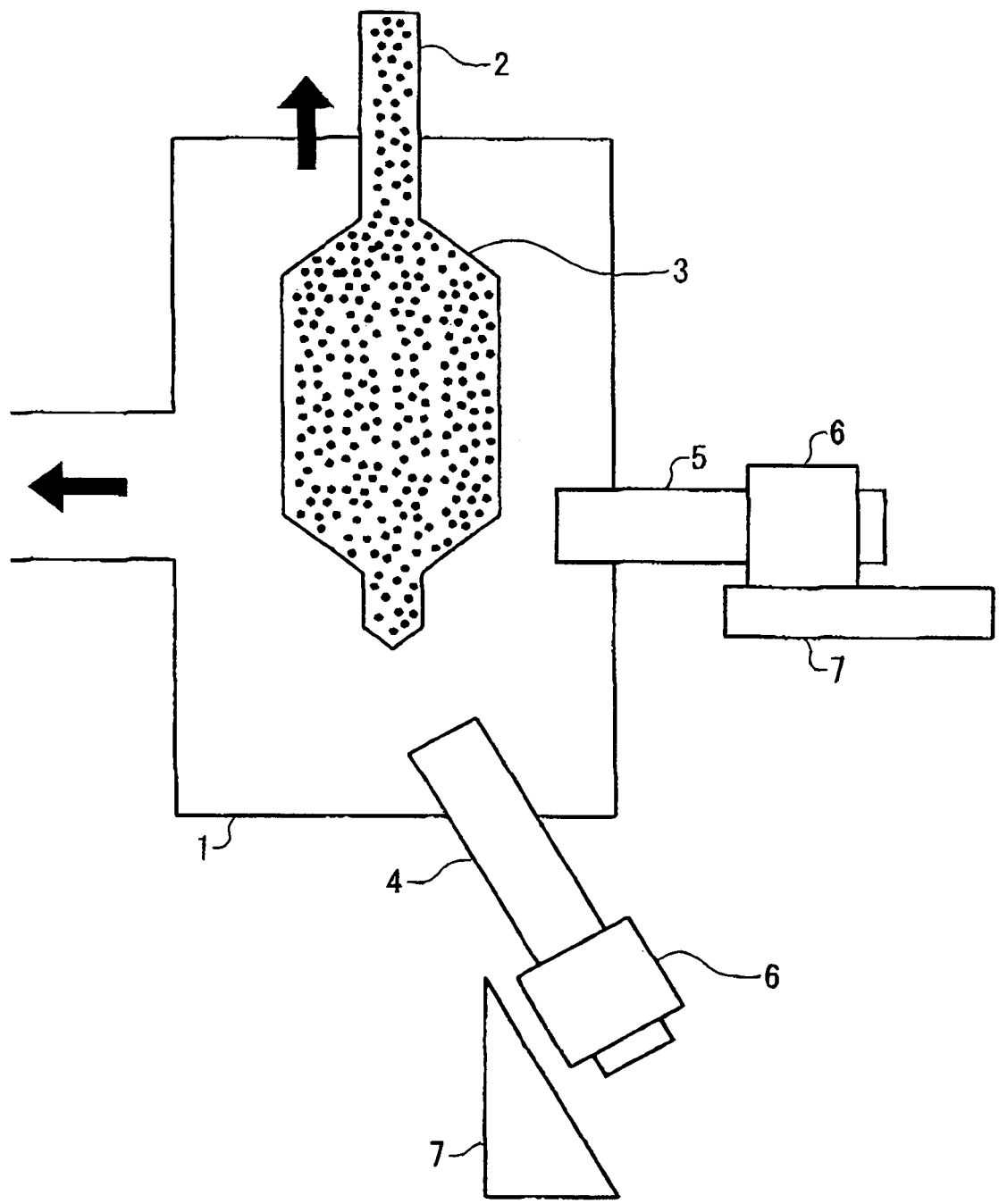
FIG. 1 is a schematic diagram showing a constitutional example of apparatus for manufacturing an optical fiber base material by using the VAD method.
Figure 2:
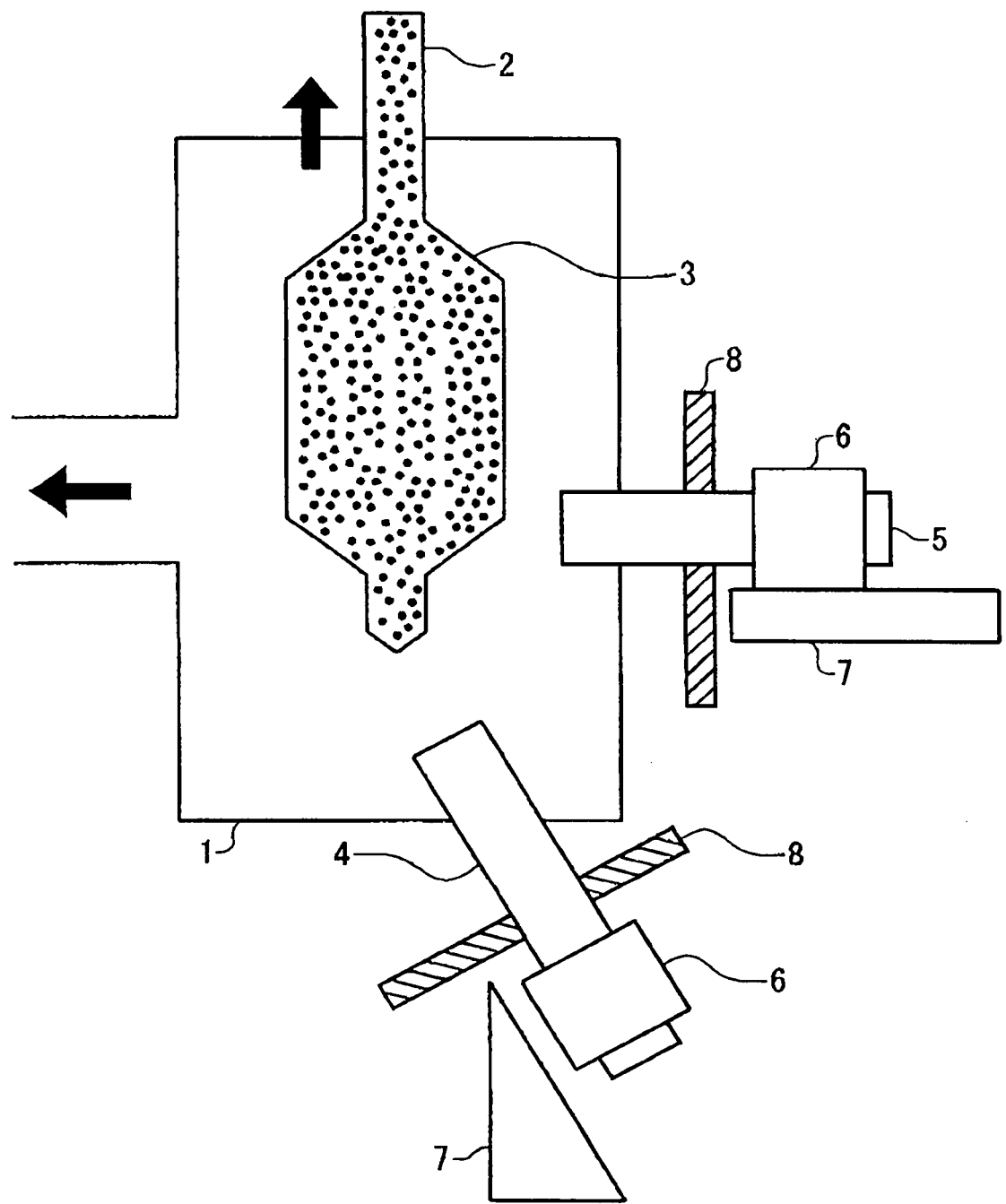
FIG. 2A is a schematic diagram showing a constitutional example of manufacturing apparatus used in an embodiment 1.

The soot deposition 3 is manufactured by using an apparatus shown in FIG. 2. Here, the components in FIG. 2 the same as those in FIG. 1 have the reference numerals the same as those of FIG. 1, so that the repeated description is omitted.

The apparatus shown in FIG. 2 has a heat shield plate 8 made of SUS, which is arranged between a burner fixing section including a burner holder 6 and a fixture 7, and burner flame. Thereby the burner fixing section is shielded from the radiant heat of the burner flame. Here, an effect on the refractive index distribution of the soot deposition 3 due to shielding the radiant heat of the burner flame is tested by using two kinds of SUS plates having the size of 100×100×5 mm and the size of 150×150×5 mm, respectively as the heat shield plate 8.

The soot deposition 3 is manufactured by supplying silicon tetrachloride ($SiCl_4$) and germanium tetrachloride ($GeCl_4$) being core materials along with $H_2$ gas and $O_2$ gas for oxyhydrogen flame to a core burner 4 and also supplying silicon tetrachloride gas and oxygen/hydrogen gas to a cladding burner 5. Then, the resultant soot deposition 3 is dehydrated and transparently vitrified to acquire an optical fiber base material having the straight body of 60 mm and the outside diameter of 100 mm.

The maximum temperature and the minimum temperature of the surface of the burner fixing section including the burner holder 6 and its fixture 7, which are measured during depositing soot are indicated in the following Table 1. In addition, the measurement result of the core/cladding refractive index difference $\Delta n_1$ is indicated by a graph in FIG. 3.

TABLE 1

| HEAT SHIELD PLATE | | MINIMUM TEMPERATURE (STOP) | MAXIMUM TEMPERATURE (DEPOSIT) | FLUCTUATION BAND |
|---|---|---|---|---|
| SIZE 100 × 100 mm | BURNER HOLDER | 22° C. | 115° C. | 93° C. |
| | FIXTURE | 22° C. | 111° C. | 89° C. |
| SIZE 150 × 150 mm | BURNER HOLDER | 22° C. | 98° C. | 76° C. |
| | FIXTURE | 22° C. | 96° C. | 74° C. |

Figure 3:
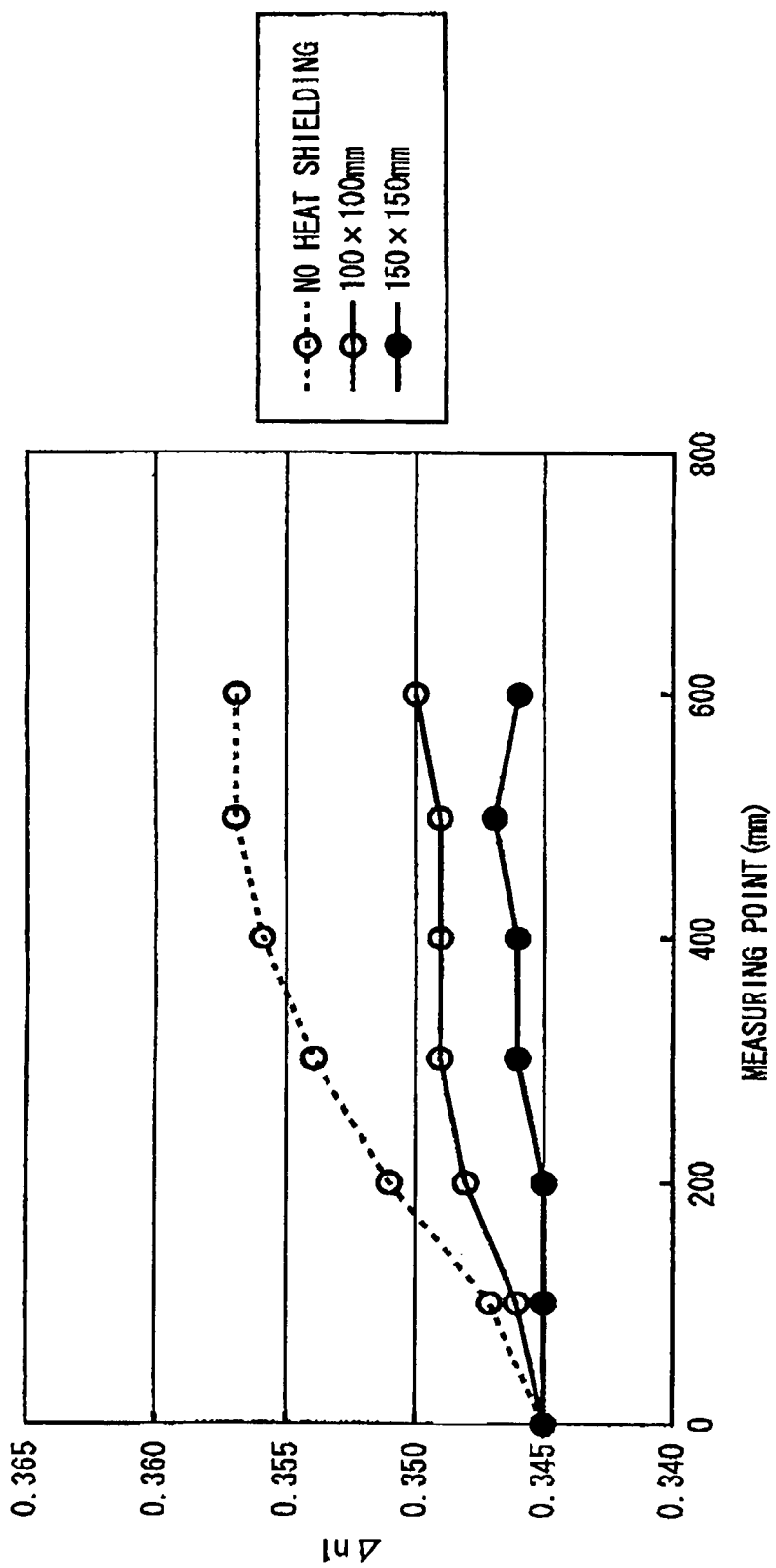
FIG. 3 is a graph showing the fluctuation of the refractive index difference $\Delta n_1$ of the optical fiber base material obtained in the embodiment 1.

As evidenced by the result indicated by Table 1 and FIG. 3, the fluctuation band of the surface temperature of the burner fixing section during depositing the soot is equal to or less than 80 degree C., so that any effect of the displacement of the burners 4 and 5 due to the thermal expansion can be restrained. In addition, the change of the refractive index profile of the resultant optical fiber base material in the axial direction can be reduced. Thereby the core/cladding refractive index difference $\Delta n_1$ of all over the resultant optical fiber base material is not beyond the bounds of permissibility. Here, for the advantage of the heat shield plate 8, it more notably appears in the heat shield plate 8 having larger size and the same effect can appear between each manufacturing step.

Embodiment 2

Figure 4:
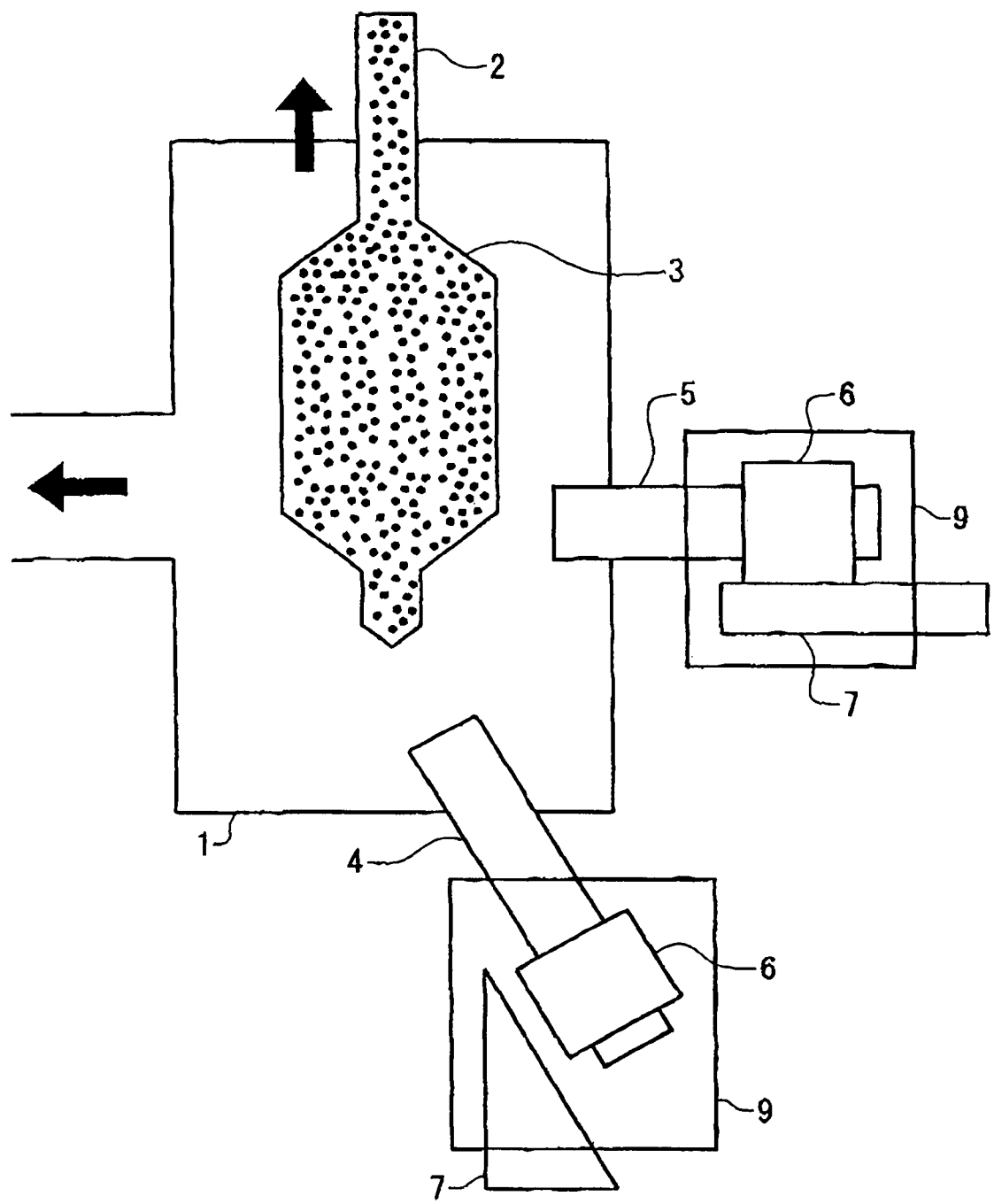
FIG. 4 is a schematic diagram showing a constitutional example of manufacturing apparatus used in an embodiment 2.

The optical fiber base material is manufactured with the material and under the condition the same as those of the embodiment 1 except for using the manufacturing apparatus shown in FIG. 4. Here, the components in FIG. 4 the same as those in FIG. 1 and FIG. 2 have the reference numerals the same as those of FIG. 1 and FIG. 2, so that the repeated description is omitted.

Figure 5:
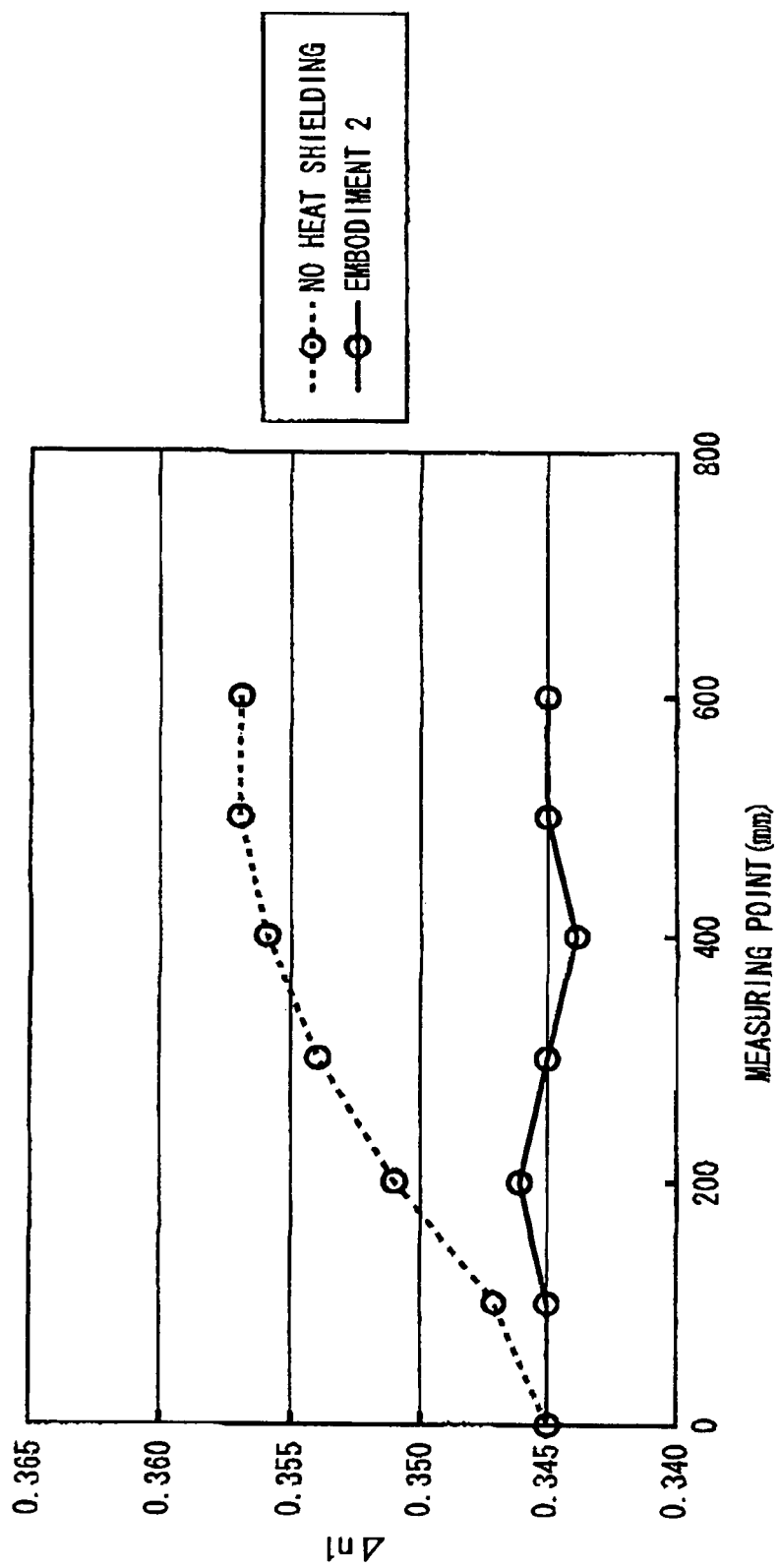
FIG. 5 is a graph showing the fluctuation of the refractive index difference $\Delta n_1$ of the optical fiber base material obtained in the embodiment 2.

In the manufacturing apparatus, the burner fixing section including the burner holder 6 and the fixture 7 is stored in a temperature-controlled box 9 to keep the temperature within 60 degree C.±1 degree C. The refractive index profile of the resultant optical fiber base material obtained by transparently vitrifying is measured and the measurement result is indicated by a graph in FIG. 5. The fluctuation of the refractive index profile is significantly reduced as shown in the figure.

Comparative Example

The optical fiber base material is manufactured with the material and under the condition the same as those of the embodiment 1 except for using the apparatus shown in FIG. 1.

Figure 6:
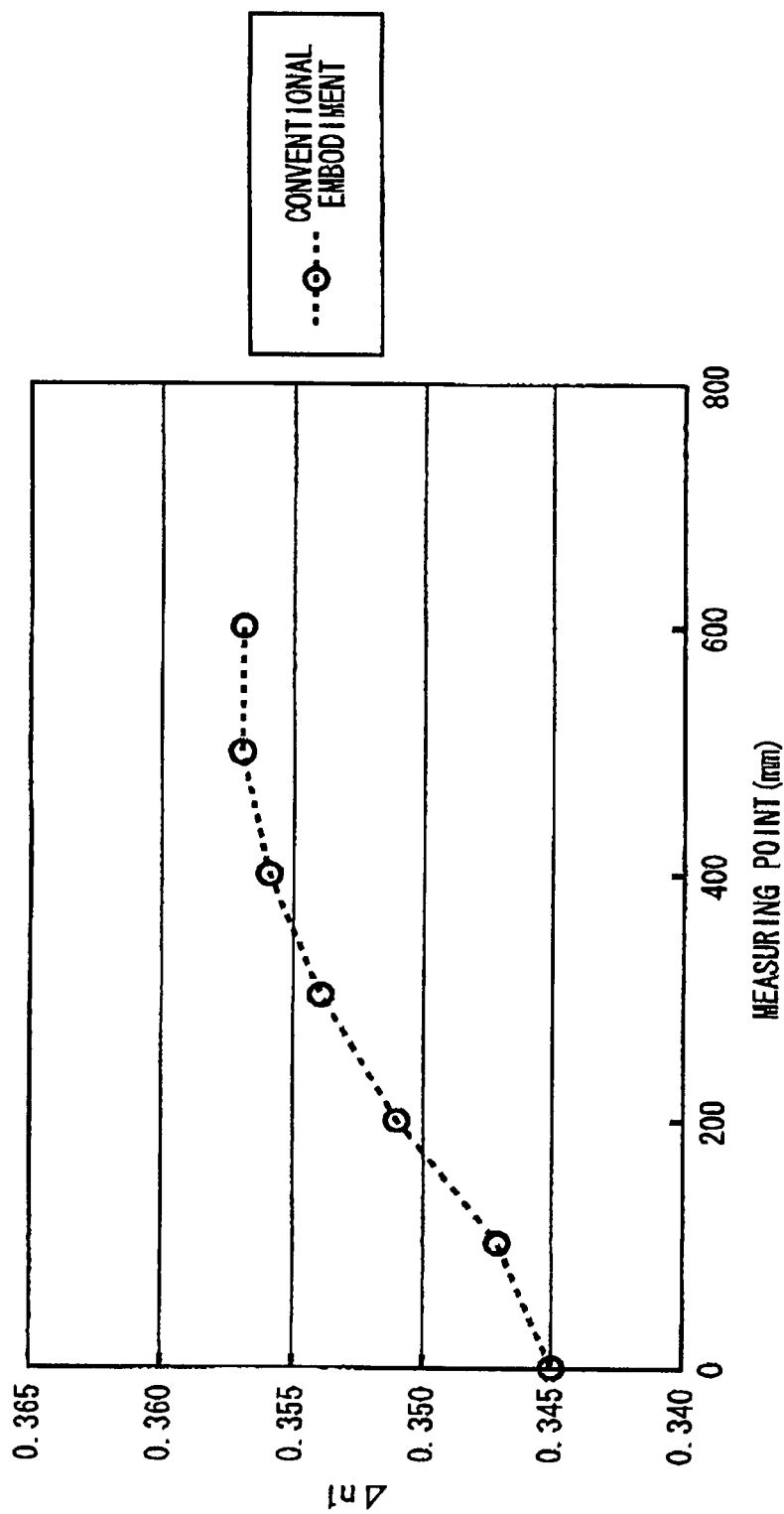
FIG. 6 is a graph showing the fluctuation of the refractive index difference $\Delta n_1$ of the optical fiber base material obtained by the conventional manufacturing method and manufacturing apparatus.

The maximum temperature and the minimum temperature of the surface of the burner fixing section including the burner holder 6 and its fixture 7, which are measured during depositing soot is indicated in the following Table 2. In addition, the measurement result of the core/cladding refractive index difference $\Delta n_1$ is indicated by a graph in FIG. 6. As evidenced by the result indicated by Table 2 and FIG. 6, the amount of fluctuation is increased as 0.012.

TABLE 2

| | MINIMUM TEMPERATURE (STOP) | MAXIMUM TEMPERATURE (DEPOSIT) | FLUCTUATION BAND |
|---|---|---|---|
| BURNER HOLDER | 22° C. | 123° C. | 101° C. |
| FIXTURE | 22° C. | 120° C. | 98° C. |

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

The method of manufacturing glass base material for an optical fiber and an apparatus therefor according to the present invention keeps the position of the burner which is accurately set during depositing soot (glass particles) or between each manufacturing step. Therefore, a high-quality optical fiber base material having the refractive index profile which is prevented from being changed in the axial direction can be acquired. Particularly, the method and the apparatus can be advantageously applied to manufacture the large-sized optical fiber base material.

What is claimed is:

1. A method of manufacturing an optical fiber base material, said method comprising:

depositing soot generated by flame hydrolysis by using a burner which generates a flame to compound the optical fiber base material, wherein a fluctuation band of a surface temperature of a burner fixing section that positions the burner is kept equal to or less than 80 degrees C. by a temperature control mechanism that controls the surface temperature of the burner fixing section and includes a temperature-controlled box in which the burner fixing section is stored, wherein the burner fixing section includes a burner holder and a fixture thereof for adjusting a position of the burner relative to the depositing soot.

2. The manufacturing method as set forth in claim 1, wherein the temperature-controlled box is kept at 60±1 degrees C.

3. The manufacturing method as set forth in claim 1, wherein during said depositing the soot, the position of the burner with respect to the depositing soot is kept constant.

4. The manufacturing method as set forth in claim 1, wherein the temperature control mechanism keeps the surface temperature of the burner fixing section in a predetermined range.

5. The manufacturing method as set forth in claim 1, wherein after the position of the burner with respect to the depositing soot is adjusted, the position of the burner is stabilized during said depositing the soot.

* * * * *